United States Patent [19]
Naruse et al.

[11] Patent Number: 4,776,084
[45] Date of Patent: Oct. 11, 1988

[54] APPARATUS FOR POSITIONING VEHICLE BODY IN ASSEMBLY LINE

[75] Inventors: Kazuo Naruse, Okazaki; Mikio Kitano; Hideaki Tobita, both of Toyota, all of Japan

[73] Assignee: Toyota Jidosha Kabushiki Kaisha, Japan

[21] Appl. No.: 14,253

[22] Filed: Feb. 11, 1987

[30] Foreign Application Priority Data

Feb. 12, 1986 [JP] Japan .................. 61-28638

[51] Int. Cl.⁴ .................. B23P 21/00; B23P 19/00
[52] U.S. Cl. .................................. 29/771; 29/799
[58] Field of Search .......... 29/771, 793, 794, 799; 198/345, 346.1, 346.2, 464, 469

[56] References Cited

U.S. PATENT DOCUMENTS

| | | | |
|---|---|---|---|
| 4,553,309 | 11/1985 | Hess et al. | 29/793 X |
| 4,589,184 | 5/1986 | Asuno et al. | 29/799 X |
| 4,589,199 | 5/1986 | Ohtaki et al. | 29/799 X |
| 4,627,158 | 12/1986 | Mitoh | 29/771 |

FOREIGN PATENT DOCUMENTS

131271/84  11/1987  Japan .

*Primary Examiner*—Timothy V. Eley
*Attorney, Agent, or Firm*—Finnegan, Henderson, Farabow, Garrett and Dunner

[57] ABSTRACT

A vehicle body positioning apparatus includes a first jig for an under body, which is located and fixed on a jig surface plate provided in a vehicle body assembly equipment, second jigs for right and left side bodies, and a third jig for upper body parts which are carried by an overhead conveyor. An arched frame, is erected on the jig surface plate perpendicular to an assembly line. A positioning and supporting assembly is provided on the arched frame and the second jigs, respectively, so as to position the third jig with respect to the first and second jigs.

12 Claims, 5 Drawing Sheets

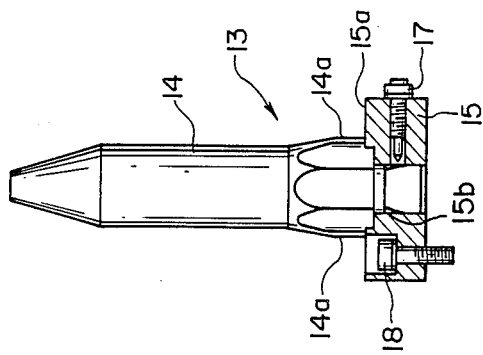
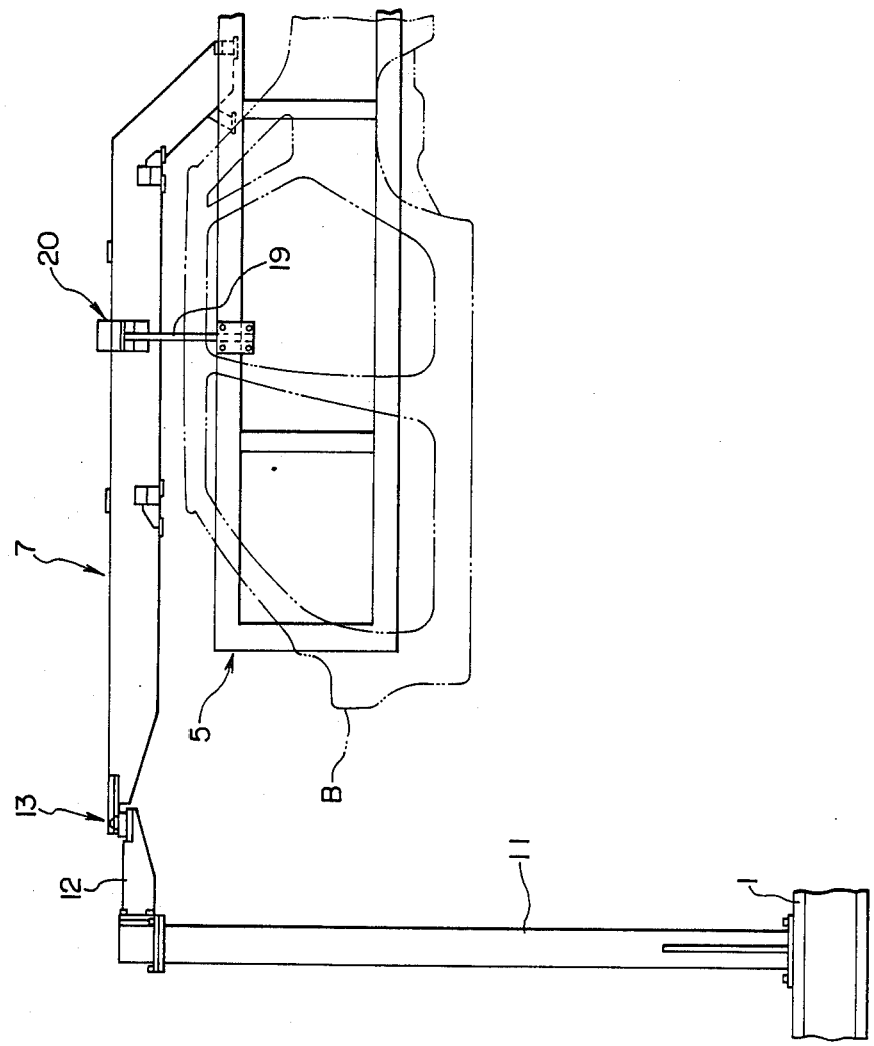

APPARATUS FOR POSITIONING VEHICLE BODY IN ASSEMBLY LINE

BACKGROUND OF THE INVENTION

1. Field of the Invention

The present invention relates to automobile assembly line apparatus; and more particularly, to apparatus for positioning main body parts of an automobile for assembly in an automobile assembly line.

2. Discussion of Prior Art

Presently, on most automobile assembly lines, various types of automobiles, such as two-door and four-door cars, coupes, and vans are produced in an irregular order, so that assembly equipment having ready adaptability to a change in auto body types is increasingly demanded.

To meet such demand, a type of apparatus, referred to as a circulating jig, is conventionally used. This type of apparatus is provided with a plurality of jig trucks, on each of which is mounted a body part manufactured exclusively for a particular type of automobile. These jig trucks are then conveyed over an endless path, or in other words circulated, so that the required body parts are conveyed to the assembly equipment as desired. More specifically, and with reference to FIG. 6, this type of apparatus includes a jig truck 51 with an under body A mounted thereon, and a jig truck 52 with a side body B mounted thereon. The jig truck 51 for the under body A is first placed on a surface plate 53 at the assembly equipment location; then the jig truck 52 for the side body B is conveyed to the assembly equipment location. After both jig trucks 51 and 52 are coupled and positioned by a coupling member 54, the under body A and the side body B are welded by welding equipment (not shown).

In the above described conventional circulating jig type of apparatus, each of the jig trucks is configured exclusively for a particular type of automobile; thus rendering it necessary to configure many different types of jig trucks in accordance with the types of automobiles to be manufactured. In addition, the apparatus for supporting the jigs is complicated. Therefore, the previously described jig trucks, such as 51 and 52, are used only for assembly of the under body A and the side body B. As a result, assembly of the roof, cowl, upper back, lower back, etc. is carried out in another assembly process.

In view of the above, a Japanese Patent Application No. 131271/1984 filed by the inventors herein and assigned to a common assignee, proposes to provide a vehicle body assembly apparatus as shown in FIG. 7, in which a distinct type of jig 57 includes a jig frame 55, having a uniform configuration; and having jig members 56 removably mounted thereon. Jig members 56 are constructed exclusively for a particular type of automobile, and are replaced as required for assembly of different types of automobiles. As shown in FIG. 7, for example, the different body parts are placed on the distinct jig 57 and brought to the assembly equipment at the same time. This apparatus is advantageous in that it enables a single jig, such as 57, to hold a plurality of body parts, such as a roof C, a cowl D, and an upper back E, as illustrated; and thus permit the assembly of such body parts in P the same process with the assembly of the under body and side body parts, to complete the assembly of the main body.

In a vehicle body assembly apparatus having the above described distinct type jig 57, the positioning of such jig at the assembly equipment, with a body part, such as a roof, cowl, or upper back mounted thereon, is accomplished by a positioning device located on the conveyor side of jig 57. Therefore, positioning of the jig is conducted from a distance, which makes it difficult to ensure the absolute positions of the body parts. Additionally, such a positioning device is unavoidably made large in size and complicated in construction.

SUMMARY OF THE INVENTION

Accordingly, it is an object of the present invention to overcome the above-described positioning problems of the prior art.

Another object of the present invention is to provide a vehicle body positioning apparatus, which is efficient and accurate in operation and simple in construction.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

To achieve the objects and in accordance with the purpose of the invention, as embodied and broadly described herein, the invention comprises positioning apparatus for vehicle body parts in the assembly of a vehicle body on a jig surface plate of an assembly line having a first jig disposed on the surface plate for supporting a vehicle underbody, second jigs disposed in a predetermined position adjacent the first jig for right and left side body parts, and a third jig disposed above the first jig for upper body parts. The positioning apparatus comprises a frame having a portion extending across the assembly line above the first jig; positioning means disposed on the extending frame portion and the second jigs for positioning the third jig in a predetermined position relative to the first and second jigs.

Preferably, each of the first, second and third jigs is comprised of a jig of uniform configuration and comprised of jig members removably mounted on the frame, and which are adapted exclusively for a particular type of automobile. Preferably, the third jig is adapted for carrying a roof, a cowl, and an upper back portion of the body parts.

Additionally, it is preferable that the positioning and supporting means include a reference pin, and the third jig has a reference aperture for receiving the pin and engages a base surface adjacent the pin.

Preferably, the frame of the positioning apparatus is erected on the front portion of the jig surface plate in the direction of travel of car bodies on the assembly line; and the positioning and supporting assembly is preferably disposed on a cross-beam of the frame directly above the center line of the path of the assembly line.

In the vehicle body positioning apparatus of the present invention, the body parts are mounted in advance on the corresponding jigs. The first jig for the under body and the second jigs for the side bodies are first brought to the assembly equipment to position and fix both the under body and side body parts. The third jig for the upper body parts is conveyed via an overhead conveyor to engage the positioning and supporting members on the positioning frame, and the second jigs thereby positioning and fixing the third jig. Thus, it is possible to facilitate and ensure the positioning of the jigs.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 4 is a side elevational view of the apparatus of FIGS. 2 and 3;

FIG. 5 is an enlarged view of a positioning and supporting member of the positioning apparatus of the described embodiment of the present invention;

DESCRIPTION OF THE PREFERRED EMBODIMENT

Figure 1:
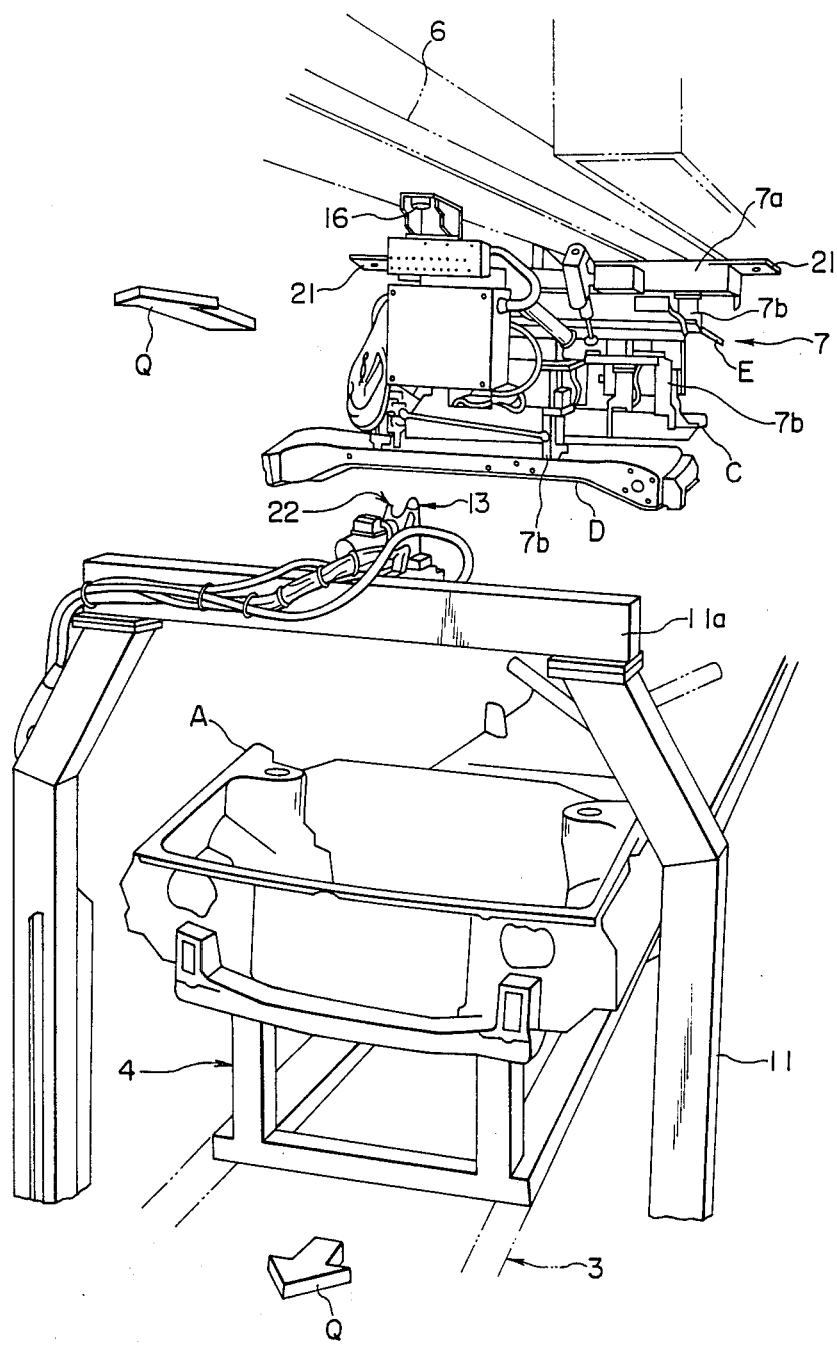
FIG. 1 is a fragmentary perspective view of an assembly line location illustrating positioning apparatus according to one embodiment of the invention.

An embodiment of the invention will be explained with reference to the accompanying drawings wherein like reference characters refer to like parts throughout the several figures.

Figure 2:
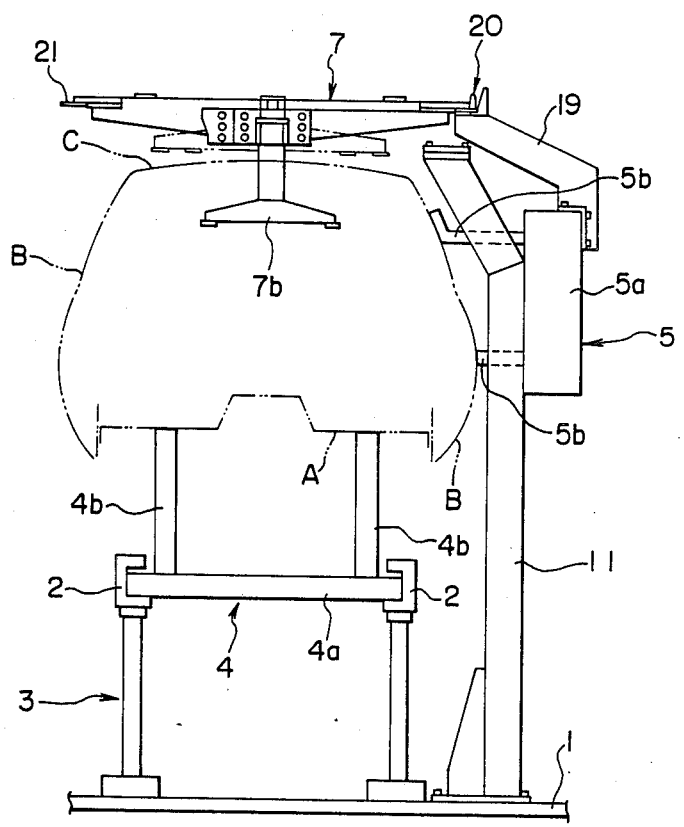
FIG. 2 is an end elevational view of the embodiment of the positioning apparatus of FIG. 1.

Referring to FIG. 2, reference numeral 1 represents a jig surface plate or base provided for the assembly equipment. Mounted on jig surface plate 1 are slide supports 3 for supporting slide rails 2. A first jig 4 having an under body A mounted thereon, is conveyed onto rails 2 of slide support 3 by a conveying means (not shown); and is positioned and fixed by a positioning means (not shown). Jig surface plate 1 is also provided with a positioning means (not shown) for positioning and fixing a pair of second jigs 5 on which are mounted right and left side bodies and which are transported to the assembly equipment by conveying means. With reference to FIG. 1, a conveyor 6 is mounted on the ceiling; and suspends a third jig 7, with upper body parts, such as a roof C, a cowl D, and an upper back E mounted thereon.

Figure 7:
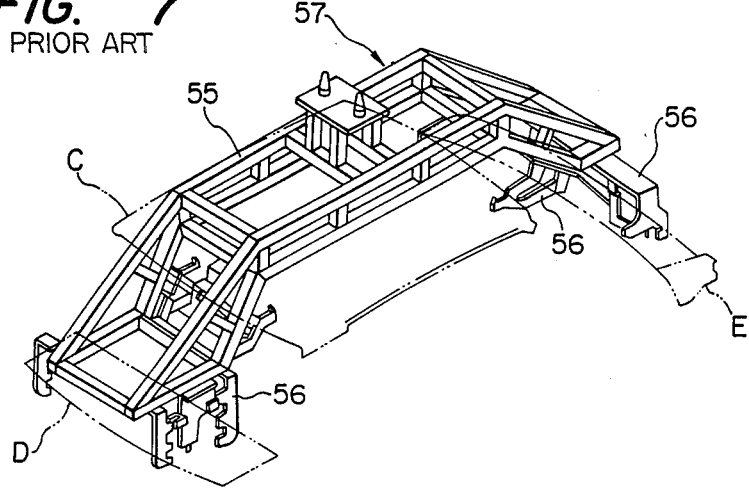
FIG. 7 is a view in perspective of an example of a jig that may be positioned in accordance with the principles of the present invention.

Referring additionally to FIG. 2, jigs 4, 5, and 7, are comprised of jig frames 4a, 5a, and 7a, each of which has a respective uniform configuration; and are also comprised of jig members 4b, 5b, and 7b respectively, which are removably mounted and configured exclusively for particular types of automobiles (see also FIG. 7). Each of the jigs 4, 5, and 7, is circulated on a predetermined circuit; and is moved in a direction indicated by an arrow Q along the path of assembly line P as shown in FIG. 1, so as to be transported to the assembly equipment at a predetermined time.

Figure 3:
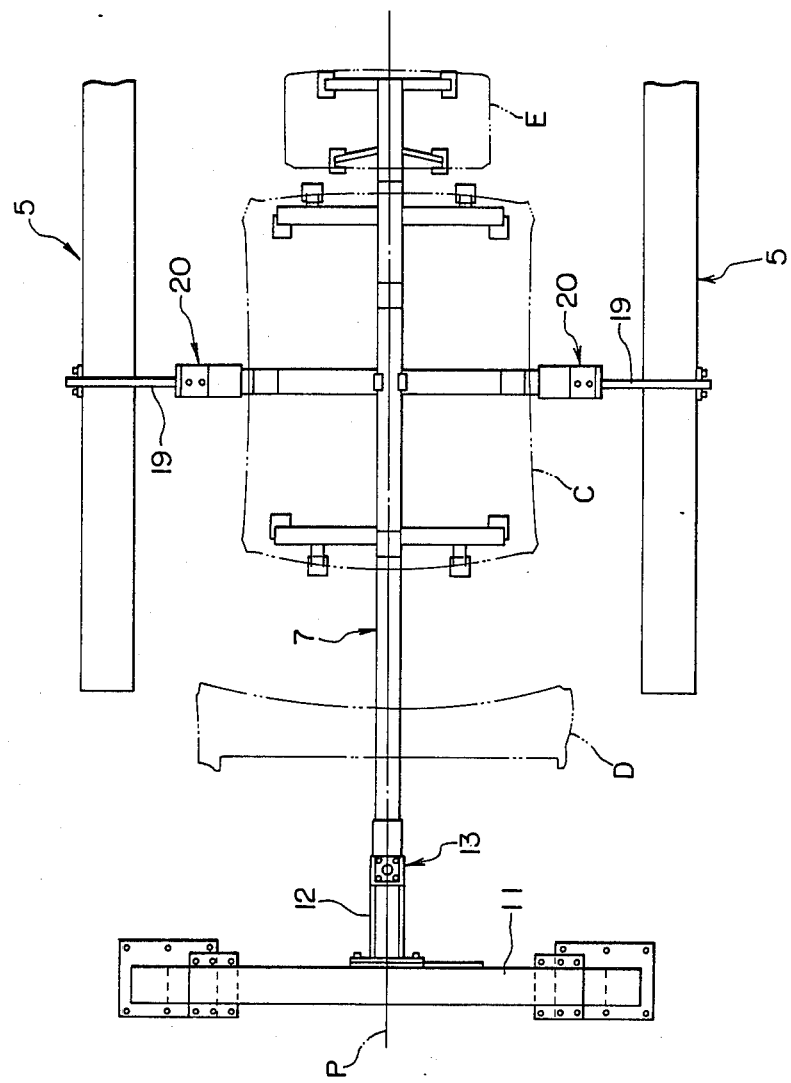
FIG. 3 is a birds-eye view of the apparatus of FIG. 2.
Figure 6:
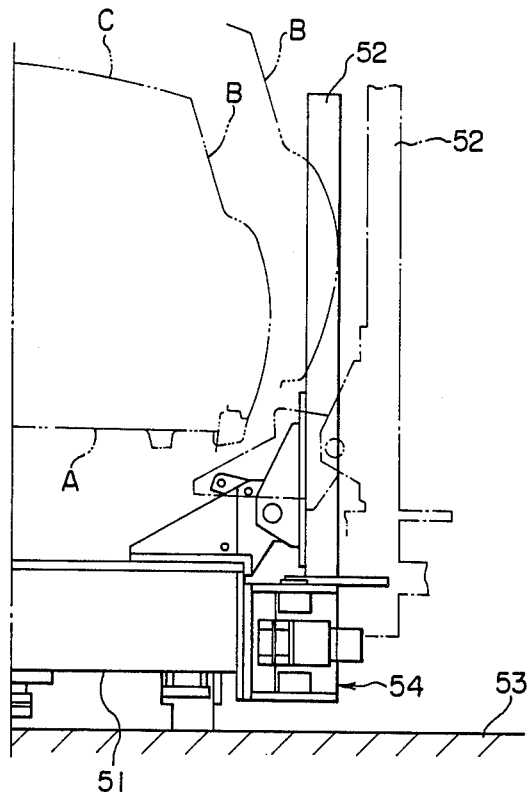
FIG. 6 is a fragmentary view in elevation of conventional vehicle body assembly, apparatus illustrating jig trucks for under body and side body assembly.

Referring additionally to FIGS. 3 through 5, an arched frame 11 in the form of a substantially inverted U, as best seen in FIG. 1, is erected on a front or forward portion of the jig surface plate 1 in the direction of travel of the jigs as indicated by the arrow Q. Spaced upright sides or legs of arched frame 11 extend in a direction substantially perpendicular to the plane of surface plate 1, and are connected by a cross beam 11a which extends substantially perpendicular to the path P (see FIG. 3) of the assembly line. The upright sides of frame 11 are spaced to straddle slide tracks 2 and supports 3; and beam 11a is of such a distance above surface 1 to clear an assembled main body traveling in the direction of arrow Q, all as shown in the drawings. A bracket 12 is mounted on beam 11a substantially at a central portion thereof and extends in a direction perpendicular to the axis of beam 11a directly above path P. A positioning and supporting assembly 13 including a pin 14 is mounted on bracket 12 to extend upwardly such that the axis of pin 13 is in substantial alignment with and perpendicular to assembly path P.

Referring to FIG. 5, positioning and supporting assembly 13 includes a base member 15, which resembles a washer, in that it has opposite parallel plane surfaces, one of which is referred to as 15a, and a central opening 15b. Reference pin 14 has an axial extension of reduced diameter to removably fit in central opening 15b of washer 15. Reference pin 14 is secured to base member or washer 15 by a bolt 17 which extends radially into central opening 15b intermediate the plane parallel surfaces thereof; and washer 15 in turn is secured to bracket 12 by an axially extending countersunk bolt 18. Reference pin 14 has a multi-faceted portion 14a at the base of the shank thereof adjacent planar surface 15a. Jig 7 has a reference hole or aperture 16 (see FIG. 1) having a configuration for receiving the facets of the multifaceted base portion 14a of pin 14. Plane surface 15a of washer 15 engages a corresponding surface of jig 7 when the jig is in position.

As shown in FIGS. 2, 3, and 4, jigs 5 each have a bracket 19 at the upper end thereof for mounting a positioning and supporting assembly 20, similar to the assembly 13. The positioning and supporting assemblies 20 are inserted into right and left reference holes 21, respectively, provided on the third jig 7, whereby the third jig 7 is secured to each of the second jigs. Thus, when the third jig 7 is conveyed to the assembly equipment by conveyor 6, it is positioned by pins, such as 14, of the positioning assemblies 13 and 20, which are provided on the arched frame 11 and the right and left second jigs 5, respectively. On beam 11a of arched frame 11, is a clamp unit 22 for securing the third jig 7, which is fixed on the positioning member and supporting assemblies 13 and 20.

The operation of the vehicle body apparatus having the above described structure will now be explained. Body parts are mounted on the corresponding jigs 4, 5, and 7. First jig 4, with the under body A mounted thereon, is first moved onto the slide tracks 2 of the slide support or rest 3 on surface plate 1, and positioned and secured. Next, the pair of second jigs 5, with the right and left side body parts B mounted thereon, are next conveyed on to surface plate 1, and are positioned and secured. The third jig 7 is lowered from the conveyor 6 and secured onto the washer 15 while being guided by the reference pins, such as 14 of the positoning and supporting assemblies 13 and 20. The third jig 7 is thereafter fixed on the position and supporting assembly 13 by clamp unit 22, whereby the vehicle body is ready for welding. The vehicle body assembly process is completed by welding with a welding machine (not shown).

Although each jig in the present embodiment is a distinct type of jig composed of a jig frame and jig members, the present invention is not restricted thereto; and is adaptable to an integral type jig, which is used with jig equipment of the circulating type. However, it is understood that it is restricted to assembly equipment for the mainbody of a vehicle including upper body parts.

Although a roof, a cowl, and an upper back are mounted on the third jig in the present embodiment, it is possible to design the third jig so as to carry only a roof and a cowl, or a roof and an upper back.

As described above in detail, and according to the present invention, since the positioning and supporting assemblies are provided on the arched frame erected on the jig surface plate in the assembly equipment, and also on the pair of jigs for the right and left side body parts; and the jig for the upper body parts is positioned and fixed on these assemblies, it is possible to position each jig easily and accurately.

Furthermore, since the structure of the positioning apparatus provided on the conveyor side of the third jig is simplified, not only the output of the conveyor itself; but also, the conveying efficiency of the jigs is increased.

It will be apparent to those skilled in the art that various modifications and variations can be made in the positioning apparatus of the present invention without departing from the spirit or scope of the invention. Thus, it is intended that the present invention cover the modifications and the variations of this invention provided they come within the scope of the appended claims and their equivalents.

What is claimed is:

1. An apparatus for assembling vehicle body parts in an assembly line, comprising:
   a jig surface plate;
   a first jig disposed on said surface plate for supporting a vehicle underbody;
   second jigs disposed in a selected position adjacent the first jig for supporting right and left side body parts;
   a third jig disposed above said first jig for supporting upper body parts;
   a frame having a portion extending across the assembly line above said first jig; and
   positioning means disposed on each of said extending frame portion and said second jigs for positioning said third jig in a predetermined position relative to said first and second jigs.

2. The apparatus of claim 1, wherein said jig surface plate has a front portion in the direction of assembly line travel, and said frame is disposed forward of the second jigs at the front portion of said plate.

3. The apparatus of claim 1, wherein the frame includes a pair of spaced upright members disposed to straddle said first jig, and the portion of the frame across the assembly line extends substantially perpendicular to said assembly line.

4. The apparatus of claim 1, wherein each of the positioning means comprises an assembly including a base member having a surface portion and a reference pin having an axis extending substantially normal to said surface portion for engaging said third jig.

5. The apparatus of claim 1, wherein each of said positioning means on the extending frame portion and second jigs comprises:
   an assembly including a base member having a surface portion and a reference pin having an axis extending substantially normal to said surface portion; and
   aperture means disposed in said third jig means for receiving a respective reference pin for engaging said surface portion with the third jig means at times when said third jig means is in the predetermined position.

6. An assembly apparatus for vehicle body parts in the assembly of a vehicle body comprising:
   a jig surface plate;
   a first jig disposed on said surface plate for supporting a vehicle underbody;
   second jigs disposed in a selected position adjacent the first jig supporting right and left side body parts;
   a third jig carried by an overhead conveyor along a path disposed above said first jig for supporting upper bodyparts including a roof, a cowl, and an upper back;
   an arched frame having a portion extending across the assembly line above said first jig;
   a plurality of receiving means disposed on said third jig in a predetermined spaced relationship; and
   positioning means disposed on each of said extending frame portion and said second jigs for engaging with said receiving position said third jig in a predetermined position relative to said first and second jigs.

* * * * *